United States Patent [19]

Sakakibara

[11] Patent Number: 5,147,768
[45] Date of Patent: Sep. 15, 1992

[54] SILVER HALIDE COLOR PHOTOGRAPHIC MATERIAL CONTAINING MAGNETIC RECORDING ELEMENT

[75] Inventor: Yoshio Sakakibara, Kanagawa, Japan

[73] Assignee: Fuji Photo Film Co., Ltd., Kanagawa, Japan

[21] Appl. No.: 727,163

[22] Filed: Jul. 9, 1991

[30] Foreign Application Priority Data

Jul. 10, 1990 [JP] Japan ................................. 2-181799

[51] Int. Cl.$^5$ ........................ G03C 3/02; G11B 5/633
[52] U.S. Cl. .................................... 430/501; 430/39; 430/140; 430/523; 430/270; 428/694
[58] Field of Search ................. 430/39, 501, 523, 140, 430/270; 428/694

[56] References Cited

U.S. PATENT DOCUMENTS 3,782,947  1/1974  Krall .................................... 430/21
4,279,945  7/1981  Audran et al. ........................ 430/56
4,582,754  4/1986  Ryoke et al. ......................... 428/694

*Primary Examiner*—Charles L. Bowers, Jr.
*Assistant Examiner*—Mark F. Huff
*Attorney, Agent, or Firm*—Sughrue, Mion, Zinn, Macpeak & Seas

[57] ABSTRACT

A silver halide color photographic material comprising a transparent support having provided on the frontside thereof at least one hydrophilic colloid layer at least one layer of which is a photosensitive silver halide emulsion layer, said photographic material further comprising a transparent magnetic recording layer provided on the backside of the transparent support containing a ferromagnetic fine powder dispersed in a binder at a coverage of $4 \times 10^{-3}$ g/m$^2$ or more and having a gray degree of transmission density of 70% or more and an average transmission density of 0.5 or less in the visible region. The present invention provides a recording material for recording information both optically and magnetically without adversely affecting the color balance.

11 Claims, No Drawings

SILVER HALIDE COLOR PHOTOGRAPHIC MATERIAL CONTAINING MAGNETIC RECORDING ELEMENT

FIELD OF THE INVENTION

The present invention relates to a silver halide color photographic material and, more particularly, to a silver halide color photographic material containing a magnetic recording layer which is substantially neutral gray and transparent with respect to visible rays, and also has excellent magnetic recording and reproducing characteristics.

BACKGROUND OF THE INVENTION

It was formerly very difficult to record information other than images onto a silver halide color photographic material (photosensitive material, hereinafter) at the time of photograph-taking or printing. However, it has now become practical to place a wide variety of information, including photographing conditions such as a date and weather at the time of photograph-taking, magnification/reduction ratio, and developing and printing conditions such as the number of reprinted sheets, a zooming requested area, a message, etc., in a photosensitive material by providing a magnetic recording layer as disclosed in U.S. Pat. Nos. 3,782,947, and 4,279,945, or by using signal input-output methods as disclosed in World Patents 90-04205 and 90-04212. Furthermore, output of such information from a photosensitive material into a display unit, such as a television/video, etc., has become practical. For a recording material containing both magnetic and optical recording layers it is required that the magnetic recording layer does not adversely affect photographic properties, particularly when the magnetic recording layer is laminated over the whole surface of the photographic film as disclosed in JP-B-42-4539, JP-B-57-6576 (The term "JP-B" as used herein means an "examined Japanese patent publication") and JP-A-53-109604 (The term "JP-A" as used herein means an "unexamined published Japanese patent application"). Consequently, the magnetic recording layer most desirably has high transparency and low transmission density, and is slightly dependent on wavelength in the visible region with regard to transmission density characteristics, namely, comparable to neutral gray. However, the γ-ferric oxide used in JP-B-57-6576 and JP-A-53-109604 adversely affects photographic characteristics by disturbing the color balance which is an important photographic characteristic. Since γ-ferric oxide has low transmittance with respect to light rays of short wavelengths, and high transmittance with respect to those of long wavelengths, γ-ferric oxide cannot be considered to be neutral gray. Therefore, it has been desired to improve such magnetic recording layers.

SUMMARY OF THE INVENTION

An object of the present invention is to provide a silver halide color photographic material which contains a magnetic recording layer having excellent magnetic characteristics and which does not adversely affect photographic characteristics.

The above-described object is attained by providing a silver halide color photographic material comprising a transparent support having provided on the frontside thereof at least one hydrophilic colloid layer at least one layer of which is a photosensitive silver halide emulsion layer, said photographic material further comprising a transparent magnetic recording layer provided on the backside of the transparent support, said magnetic recording layer containing a ferromagnetic fine powder dispersed in a binder at a coverage of $4 \times 10^{-3}$ g/m² or more based on the weight of the ferromagnetic fine powder and having a gray degree of transmission density of 70% or more and an average transmission density of 0.5 or less in the visible region.

DETAILED DESCRIPTION OF THE INVENTION

The term "average transmission density" as used herein refers to the average of blue, green and red filter densities defined by ISO-5/3 in the case of exposure to visible rays of wavelengths ranging from 400 to 700 nm, and the term "gray degree of transmission density" refers to the proportion (%) of the minimum to the maximum among the above-described blue, green and red filter densities. Although better results are obtained with a higher gray degree, satisfactory results are obtained when the gray degree of transmission is not less than 70%, more preferably not less than 90%. The average transmission density is 0.5 or less, preferably 0.2 or less, more preferably 0.05 or less.

As a result of an exstensive investigation of various ferromagnetic fine powders, the present inventors have discovered that ferromagnetic fine powders for use in the present invention include magnetic iron oxides containing $Fe^{2+}$ in a proportion of 5 wt % or more to $Fe^{3+}$, Co-modified magnetic iron oxides (the Co content 0.1 to 35 atomic % with respect to Fe) containing $Fe^{2+}$ in a proportion of 5 wt % or more to $Fe^{3+}$, chromium dioxide, ferromagnetic metal powders, and mixture of two or more thereof. A proportion of the $Fe^{2+}$ content to the $Fe^{3+}$ content in the magnetic iron oxides and Co-modified magnetic iron oxides is preferably 5 wt % or more, more preferably 10 wt % or more, and still more preferably 15 wt % or more, the upper limit of which are 50 wt %. For example, a magnetic iron oxide containing $Fe^{2+}$ in a proportion of 5 wt % to $Fe^{3+}$ contains 5 grams of $Fe^{2+}$ per 100 g of $Fe^{3+}$ present in the magnetic iron oxide (i.e., a weight ratio). Here, the weight ratio is the same as the mole ratio.

Because the desired magnetic characteristics are not obtained when the coverage of the ferromagnetic fine powder is minute, a suitable coverage of the ferromagnetic fine powder is at least $4 \times 10^{-3}$ g, preferably $10^{-2}$ g or greater, and more preferably $4 \times 10^{-2}$ g or greater, per m² of the transparent support. A coverage that is too high results in an increase in the above described average transmission density, resulting in a decrease of photographic speed. Accordingly, it is desirable that the coverage of the ferromagnetic fine powder is controlled such that the average transmission density is 0.5 or less.

Examples of ferromagnetic metal powders for use in the present invention include compositions containing a metal component in a proportion of at least 75 wt %, at least 80 wt % of said metal component being constituted by at least one kind of ferromagnetic metal or alloy (e.g., Fe, Co, Ni, Fe-Co, Fe-Ni, Co-Ni, Co-Fe-Ni), and the remaining portion of said metal component being constituted by other elements (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). Also, the above-described ferromagnetic metal component may contain a small quantity of water, hydroxide or oxide.

Preparation of the above described ferromagnetic powders are known, and ferromagnetic powders useful in the present invention can also be prepared in accordance with known processes.

The ferromagnetic powder for use in the present invention is not particularly limited with respect to pH and surface treatment. More specifically, the ferromagnetic powder may be subjected to surface treatment using a substance containing an element such as titanium, silicon, aluminum or the like, or surface treatment with a carboxylic acid, a sulfonic acid, a sulfuric acid ester, phosphonic acid, a phosphoric acid ester, or an adsorptive organic compound such as a nitrogen-containing heterocyclic compound including benzotriazole and the like. A preferred pH range is from 5 to 10.

Examples of binders for use in the present invention include known thermoplastic resins, thermosetting resins, radiation curable resins, reaction type resins and mixtures of two or more thereof, which materials are known for use as a binder for magnetic recording materials. The binder is used in an amount of 0.1 to 10 g/m$^2$, preferably 0.4 to 2 g/m$^2$.

The above-noted resins have a glass transition point (Tg) ranging from $-40°$ C. to $150°$ C., and a weight average molecular weight ranging from 10,000 to 300,000, preferably from 10,000 to 100,000.

Examples of the thermoplastic resin for use as a binder in the present invention include vinyl copolymers such as vinyl chloride-vinyl acetate copolymer, copolymers of vinyl chloride, vinyl acetate, vinyl alcohol, and maleic acid and/or acrylic acid, vinyl chloride-vinylidene chloride copolymer, vinyl chloride-acrylonitrile copolymer, ethylene-vinyl acetate copolymer, etc.; cellulose derivatives such as nitrocellulose, cellulose acetate propionate, cellulose acetate butyrate, cellulose diacetate, cellulose triacetate, etc.; synthetic rubber resins such as acryl resin, polyvinyl acetal resin, polyvinyl butyral resin, polyester-polyurethane resin, polyether-poly-urethane resin, polycarbonate-polyurethane resin, polyester resin, polyether resin, polyamide resin, amino resin, styrene-butadiene resin, butadiene-acrylonitrile resin, etc.; silicone resins; and fluorine-containing resins.

Among these resins, vinyl chloride resins are preferred because ferromagnetic fine powders have high dispersibility therein.

Thermosetting resins or reaction type resins for use in the present invention are those which increase in molecular weight upon heating, specific examples including phenol resin, phenoxy resin, epoxy resin, curable type polyurethane resin, urea resin, melamine resin, alkyd resin, silicone resin, acryl type reaction resin, epoxy-polyamide resin, nitrocellulose-melamine resin, a mixture of high molecular weight polyester resin with isocyanate prepolymer, urea-formaldehyde resin, a mixture of a low molecular weight glycol, a high molecular weight diol and a polyisocyanate, polyamine resin, and mixtures of two or more of the above-cited resins.

Radiation curable resins for use in the present invention are those obtained by introducing C—C unsaturated bond-containing groups as radiation-curable functional groups into the above-noted thermoplastic resins. Suitable examples of such functional groups include acryloyl group, methacryloyl group, etc.

When polar groups (e.g., epoxy group, $CO_2M$, OH, $NR_2$, $NR_3X$, $SO_3M$, $OSO_3M$, $PO_3M_2$, $OPO_3M_2$, wherein M represents a hydrogen atom, an alkali metal atom or an ammonium ion, two M's in one group may be the same or different, R represents a hydrogen atom or a $C_{1-10}$ alkyl group, and X represents a halogen atom) are introduced into the above-noted binder molecules, the resulting binder exhibits enhanced dispersibility of magnetic substances and durability. The content of the polar group is within the range of $10^{-7}$ to $10^{-3}$ equivalent, preferably $10^{-6}$ to $10^{-4}$ equivalent, per gram of polymer.

The above-described polymer binders may be used alone, or as a mixture of several kinds thereof. Furthermore, the polymer binder can be subjected to a curing treatment by the addition of known isocyanate type cross-linking agents, and/or radiation curable vinyl monomers.

Useful isocyanate type cross-linking agents include polyisocyanate compounds containing two or more of isocyanate groups, such as tolylene diisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, triphenylmethanediisocyanate, etc.; reaction products of isocyanates as noted above with polyhydric alcohols; and polyisocyanates produced by condensation of isocyanates as noted above. The above described polyisocyanates are commercially available from Nippon Polyurethane Industry Co., Ltd. (bearing trade names of Collonate L, Collonate HL, Collonate H, Collonate EH, Collonate 2014, Collonate 2030, Collonate 2031, Collonate 2036, Collonate 3015, Collonate 3040, Collonate 3041, Millionate MR, Millionate MTL, Daltosec 1350, Daltosec 2170, and Daltosec 2280), from Takeda Chemical Industries Ltd. (bearing trade names of Takenate D102, Takenate D110N, Takenate D200 and Takenate D202), form Sumitomo Bayer Co., Ltd. (bearing a trade name of Sumidur N75), from Farbenfarbriken Bayer A. G. (bearing trade names of Desmodur L, Desmodur IL, Desmodur N and Desmodur HL), and from Dainippon Ink & Chemicals, Inc. (bearing trade names of Burnock D850 and Burnock D802), etc.

Radiation curable vinyl monomers for use in the present invention are compounds which undergo polymerization by irradiation with radiation, namely, compounds containing one or more of a C—C unsaturated bond in a molecule, useful examples including (meth)acrylic acid esters, (meth)acrylamides, allyl compounds, vinyl esters, vinyl ethers, vinyl group-containing heterocyclic compounds, N-vinyl compounds, styrene, (meth)-acrylic acid, crotonic acid, itaconic acid, olefinic acids, etc. Among these compounds, those containing two or more of (meth)acryloyl groups are preferred. Specific examples thereof include (meth)-acrylates of polyethylene glycols, such as diethyleneglycol di(meth)acrylate, triethyleneglycol di(meth)-acrylate, etc., trimethylolpropane tri(meth)acrylate, pentaerythritol tetra(meth)acrylate, dipentaerythritol penta(meth)acrylate, dipentaerythritol hexa(metha)acrylate, and reaction products of polyisocyanate with hydroxyl(meth)acrylate compounds.

The cross-linking agent is preferably contained in an amount of from 5 to 45 wt % of the total binder content including the cross-linking agent.

Also, hydrophilic binders can be used in the magnetic recording layer of the present invention. The hydrophilic binder is used in an amount of 0.1 to 10 g/m$^2$, preferably 0.4 to 2 g/m$^2$.

Hydrophilic binders for use in the present invention are those described in *Research Disclosure*, No. 17643, p. 26, and ibid., No. 18716, p. 651, and specifically include water-soluble polymers, cellulose esters, latex polymers, and water-soluble polyesters. Specific examples of water-soluble polymers include gelatin, gelatin derivatives, casein, agar, sodium alginate, starch, polyvinyl alcohol, polyacrylic acid copolymers, maleic anhydride copolymers, etc. Specific examples of cellulose esters include carboxymethyl cellulose, hydroxyethyl cellulose, etc. Specific examples of latex polymers include vinyl chloride-containing copolymers, vinylidene chloride-containing copolymers, acrylic acid ester-containing copolymers, vinyl acetate-containing copolymers, butadiene-containing copolymers, etc. Among these hydrophilic binders, gelatin is most preferred.

As for the gelatin, any of alkali-processed (lime-processed) gelatin which has been dipped in an alkali bath before extraction in the preparation thereof, acid-processed gelatin which has been dipped in an acid bath, double dipped gelatin subjected to both of the above-described processings, and the enzyme-processed gelatin may be used. The gelatin may be partly replaced, if desired, by colloidal albumin, casein, cellulose derivatives such as carboxymethyl cellulose, hydroxyethyl cellulose, etc., sugar derivatives such as agar, sodium alginate, starch derivatives, dextran, etc., synthetic hydrophilic colloids such as polyvinyl alcohol, poly-N-vinyl-pyrrolidone, polyacrylic acid copolymer, polyacrylamide or its derivatives, partial hydrolysis products of gelatin, or gelatin derivatives.

The magnetic recording layer of the present invention containing gelatin is preferably hardened. Specific examples of a hardener for use in the magnetic recording layer of the present invention include aldehyde series compounds such as formaldehyde, glutaraldehyde, etc., ketone compounds such as diacetyl, cyclopentanedione, etc., reactive halogen-containing compounds such as bis(2-chloroethylurea), 2-hydroxy-4,6-dichloro-1,3,5-triazine, the compounds disclosed in U.S. Pat. Nos. 3,288,775 and 2,732,303, and British Patents 974,723 and 1,167,207, reactive olefin-containing compounds such as divinylsulfone, 5-acetyl-1,3-diacryloyl-hexahydro-1,3,5-triazine, and the compounds disclosed in U.S. Pat. Nos. 3,635,718 and 3,232,763, and British Patent 994,869, N-methylol compounds such as N-hydroxymethylphthalimide and those disclosed in U.S. Pat. Nos. 2,732,316 and 2,586,168, the isocyanates disclosed in U.S. Pat. No. 3,103,437, the aziridines disclosed in U.S. Pat. Nos. 3,017,280 and 2,983,611, the acid derivatives disclosed in U.S. Pat. Nos. 2,725,294 and 2,725,295, the epoxy compounds disclosed in U.S. Pat. No. 3,091,537, and halogenocarboxyaldehydes such as mucochloric acid. Useful examples of inorganic hardeners, on the other hand, include chrome alum, zirconium sulfate and the carboxyl active hardeners disclosed in JP-B-56-12853, JP-B-58-32699, Belgian Patent 825,726, JP-A-60-225148, JP-A-51-126125, JP-B-58-50699, JP-A-52-54427 and U.S. Pat. No. 3,321,313.

The hardener is generally used in an amount of from 0.01 to 30 wt %, preferably from 0.05 to 20 wt %, to the amount of dried gelatin.

The thickness of the magnetic recording layer ranges from 0.1 to 10 microns, preferably from 0.5 to 5 microns, and more preferably from 1 to 3 microns.

The magnetic recording layer can additionally contain an antistatic agent, a lubricant, a matting agent, a surface active agent, etc.

Useful examples of the lubricant include saturated and unsaturated fatty acids (including individual fatty acids such as myristic acid, stearic acid, oleic acid, etc., and mixed fatty acids such as the decomposition products of natural oils including animal and vegetable oils, and those obtained by hydrogenation of the above noted decomposition products), metal soaps, N-substituted or unsubstituted fatty acid amides, fatty acid esters (including monoesters of fatty acids, polyesters of fatty acids and polyhydric alcohols such as sorbitol, glycerol, etc., and esterification products of polybasic acids), esterified compounds containing one or more ether bonds, higher aliphatic alcohols, monoalkylphosphates, dialkylphosphates, trialkylphos-phates, paraffins, silicone oils, animal-vegetable oils, mineral oils, higher aliphatic amines; inorganic powders such as graphite, silica, molybdenum disulfide, tungsten disulfides; and resins such as polyethylene, polypropylene, polyvinyl chloride, ethylene-vinyl chloride copolymer, polytetrafluoroethylene, etc.

Useful examples of the antistatic agent include conductive fine powders such as carbon black, carbon black grafted polymer, etc.; natural surfactants such as saponin, etc.; alkylene oxide type nonionic surfactants, glycerin type surfactants, glycidol type surfactants, etc.; cationic surfactants such as higher alkyl amines, quaternary ammonium salts, salts of pyridine and other heterocyclic compounds, phosphoniums or sulfoniums, etc.; anionic surfactants containing an acid group such as carboxyl, phosphono, sulfate, phosphate, etc.; and amphoteric surfactants such as amino acids, aminosulfonic acids, sulfates or phosphates of aminoalcohols, etc.

In addition, fine grains of metal oxides such as $ZnO$, $TiO_3$, $SnO_2$, $Al_2O_3$, $In_2O_3$, $SiO_2$, $MgO$, $BaO$, $MoO_3$, etc., are advantageously employed as antistatic agents.

The magnetic recording layer is preferably formed on the back side of the photosensitive material. More specifically, the magnetic recording layer can be provided on the back side of a transparent support opposite the side of the support having thereon the silver halide emulsion layer using a coating or printing technique. Also, it is advantageous to form a transparent support provided with a magnetic recording layer by co-spreading flows of a polymer solution containing dispersed magnetized particles and a polymer solution for forming the transparent support. In this case, it is preferable to employ substantially the same polymer compositions for the two kinds of flows.

Various functions including enhancement of lubricity, control of curling, prevention of generation of static charges, prevention of adhesion, etc., may be provided to the magnetic recording layer, or various functional layers may be provided independently of the magnetic recording layer. In order to enhance scratching resistance, a protective layer adjacent to the magnetic recording layer may be provided, if necessary.

The back side of the transparent support provided with the magnetic recording layer is generally subjected to calendering treatment in order to enhance smoothness, to thereby provide an improvement in S/N ratio of the magnetic signal. The light-sensitive composition is preferably coated on the transparent support after the calendering treatment.

The transparent support for use in the present invention includes various kinds of plastic films. Useful examples include films of cellulose derivatives (such as diacetyl cellulose, triacetyl cellulose, propionyl cellulose, butanoyl cellulose, cellulose acetylpropionyl-acetate, etc.), the polyamides, polycarbonates disclosed in U.S. Patent 3,023,101, polyesters disclosed in JP-B-48-40414 (such as polyethylene terephthalate, poly-1,4-cyclohexanedimethylene terephthalate, polyethylene naphthalate, etc.), polystyrene, polypropylene, polyethylene, polysulfone, polyacrylate, polyether imide, etc. Among them, particularly preferred films are triacetyl cellulose film and polyethylene terephthalate.

Plasticizers may be added to certain support materials for the purpose of imparting flexibility thereto. For instance, plasticizers such as triphenyl phosphate, biphenyl diphenyl phosphate, dimethyl ethyl phosphate and the like are usually added to cellulose esters.

The support may be a sheet having a thickness of from about 1 mm to a thin film having a thickness of about 20 μm, depending on the constituent polymer and application. In general, the support has a thickness of from 50 μm to 300 μm.

Constituent polymers of the support have a molecular weight of preferably at least 5,000, more preferably from 10,000 to 1,000,000.

The support may contain a dye for neutralization of base tint, prevention of light piping, prevention of halation, etc..

To promote good adhesion of photographic layers, e.g., silver halide emulsion layers, interlayers, filter layers, etc. and the transparent magnetic recording layer to the support, as described above, the above noted constituent layers may be provided directly on the support after the support has been subjected to surface activation treatment such as a chemical treatment, a mechanical treatment, a corona discharge treatment, a flame treatment, an ultraviolet treatment, a high frequency wave treatment, a glow discharge treatment, an active plasma treatment, a laser treatment, a mixed acid treatment, an ozone oxidation treatment, etc. on the other hand, a subbing layer may be provided on the support without subjecting the support to surface treatment, and the photographic emulsion is coated thereon.

Subbing methods have been widely investigated. In the double layer method, for example, a number of polymers including copolymers prepared using as starting materials two or more monomers selected from among vinyl chloride, vinylidene chloride, butadiene, methacrylic acid, acrylic acid, itaconic acid, maleic anhydride, etc., polyethyleneimine, epoxy resin, grafted gelatin, nitrocellulose, etc., have been examined for use as the first subbing layer. Gelatins have mainly been considered for use as the second subbing layer.

In many cases of the single layer method, satisfactory adhesion is attained by taking advantage of the interfacial mixing between polymers for the support and the subbing layer. This effect tends to occur in the case of using cellulose derivatives for the support.

In this method, a support formed from cellulose derivatives is provided with a subbing layer by coating thereon a dispersion of gelatin in a methylene chloride/ketone/alcohol mixture in the form of a single layer.

Gelatin hardeners for use with a subbing layer containing gelatin include chromium salts (e.g., chrome alum), aldehydes (e.g., formaldehyde, glutaraldehyde), isocyanates, active halogen compounds (e.g., 2,4-dichloro-6-hydroxy-s-triazine), epichlorohydrin resin, etc. A coating composition for such a subbing layer can contain various kinds of additives, if needed. Examples of suitable additives include surfactants, antistatic agents, antihalation agents, dyes or pigments for coloration, coating aids, antifoggants, etc. In addition, the coating composition for the subbing layer of the present invention can contain an etching agent such as resorcinol, chloral hydrate, chlorophenol, or the like.

Subbing layers for use in the present invention can contain a matting agent such as fine grains of inorganic substances, e.g., $SiO_2$, $TiO_2$, etc., or fine particles of methylmethacrylate copolymers (1–10 μm in size).

Coating compositions for the subbing layer for use in the present invention can be coated using a dip coating method, an air knife coating method, a curtain coating method, a roller coating method, a wire bar coating method, a gravure coating method, or an extrusion coating method utilizing the hopper disclosed in U.S. Pat. No. 2,681,294. Also, two or more layers can be coated simultaneously, if desired, using methods as disclosed in U.S. Pat. Nos. 2,761,791, 3,508,947, 2,941,893 and 3,526,582, or those described in Yuji Harasaki, *Coating Kogaku* (which means "coating engineering"), p. 253, Asakura Shoten (1973).

Representative silver halide color photographic materials particularly preferred for use in the present invention are color reversal films and color negative films.

The photographic material of the present invention may comprise a support having thereon at least one blue-sensitive, green-sensitive or red-sensitive silver halide emulsion layer. These silver halide emulsion layers and other light-insensitive layers are not particularly limited with regard to the number of constituent layers and the order of their arrangement. A typical silver halide color photographic material for use in the present invention comprises a support having thereon at least one light-sensitive unit layer constituted by two or more silver halide emulsion layers having substantially the same color sensitivity but differing in photographic speed. The unit light-sensitive layer may have a color sensitivity to any of blue light, green light and red light. For a multilayer silver halide color photographic material, the various layers may be arranged in the order of a support, a red-sensitive layer, a green-sensitive layer and a blue-sensitive layer. However, the above described order may be reversed depending on the application. Also, a light-sensitive layer differing in color sensitivity may be arranged between layers having the same color sensitivity.

Moreover, light-insensitive layers including various kinds of interlayers may be provided between the silver halide light-sensitive layers, and other light-insensitive layers may be provided at the topmost and the lowest positions.

The interlayers may contain couplers and DIR compounds as disclosed in JP-A-61-43748, JP-A-59-113438, JP-59-113440, JP-A-61-20037 and JP-A-61-20038, and conventionally used color stain inhibitors may also be incorporated therein.

Plural silver halide emulsion layers which constitute each of the unit light-sensitive layers are described in detail, e.g., in West German Patent 1,121,470, British Patent 923,045, JP-A-57-112751, JP-A-62-200350, JP-A-62-206541, JP-A-62-206543, JP-A-56-25738, JP-A-62-63936, JP-A-59-202464, JP-B-55-34932 and JP-B-49-15495.

Silver halide grains for use in the photographic emulsions may be those having a regular crystal form, such as that of a cube, an octahedron, a tetradecahedron, etc., or those having an irregular crystal form, such as that of a sphere, a plate, etc., or those having crystal imperfections, such as twinned plane, or those having a composite form of two or more of the above-described structures.

The silver halide grains may be fine grains having a size of about 0.2 microns or less, or coarse ones having a projected-area corresponding diameter up to about 10 microns. As for the distribution of sizes among grains, both monodisperse emulsions and polydisperse emulsions may be employed.

Silver halide photographic emulsions for use in this invention can be prepared using the known methods described, e.g., in *Research Disclosure* (abbreviated as RD, hereinafter), No. 17643, pp. 22-23, entitled "1. Emulsion Preparation and Types", (Dec. 1978); and *Supra*, No. 18716, p. 648 (Nov. 1979); P. Glafkides, *Chimie et Physique Photographique*, Paul Montel, Paris (1967), G. F. Duffin, *Photographic Emulsion Chemistry*, The Focal Press, London (1966), V. L. Zelikman et al, *Making and Coating Photographic Emulsion*, The Focal Press, London (1964), etc.

Monodisperse emulsions disclosed, e.g., in U.S. Pat. Nos. 3,574,628 and 3,655,394, and British Patent 1,413,748 are also used to advantage.

Also, tabular grains with an aspect ratio of at least 5 can be used in the present invention. Such tabular grains are readily prepared in accordance with methods as described, e.g., in Gutoff, *Photographic Science and Engineering*, vol. 14, pp. 248-257 (1970), U.S. Pat. Nos. 4,434,226, 4,414,310, 4,433,048 and 4,439,520, British Patent 2,112,157, etc.

The crystal structure of the grains may be uniform throughout, or the interior and the surface of the grains may differ in halide composition, or the grains may have a layer structure. Furthermore, silver halide grains in which crystal surfaces differing in halide composition are fused together through epitaxial growth, or emulsion grains in which the silver halide grains are fused together with a salt other than silver halide, such as silver thiocyanate, lead oxide or the like may also be used.

A mixture of grains with various crystal forms may be used.

Silver halide emulsions which have been subjected to physical ripening, chemical ripening and spectral sensitization treatments are generally used. The effect of the present invention is pronounced when emulsions sensitized by the combined use of a gold compound and a sulfur-containing compound are used. Additives used in these steps are described in *Research Disclosure* Nos. 17643 and 18716, and the pages on which these additives are described are summarized in the following table.

In addition, other known photographic additives for use in the present invention are described in the above noted two literature references, and are also set forth in the following table.

| Kind of Additives | RD 17643 | RD 18716 |
|---|---|---|
| 1. Chemical Sensitizers | Page 23 | Page 648, right column |
| 2. Sensitivity Increasing Agents | | " |
| 3. Spectral Sensitizer and Supersensitizing Agent | Pages 23 to 24 | Page 648, right column to page 649, right column |
| 4. Brightening Agent | Page 24 | |
| 5. Antifoggant and Stabilizer | Pages 24 to 25 | Page 649, right column |
| 6. Light-Absorbent, Filter Dye, and Ultraviolet Absorbent | Pages 25 to 26 | Page 649, right column and page 650, left column |

-continued

| Kind of Additives | RD 17643 | RD 18716 |
|---|---|---|
| 7. Stain Inhibitor | Page 25, right column | Page 650, from left to right column |
| 8. Dye Image Stabilizer | Page 25 | |
| 9. Hardener | Page 26 | Page 651, left column |
| 10. Binder | Page 26 | " |
| 11. Plasticizer and Lubricant | Page 27 | Page 650, right column |
| 12. Coating Aid and Surfactant | Pages 26 to 27 | " |

In order to prevent photographic properties from deteriorating due to formaldehyde gas, it is desirable in the present invention to incorporate into the photographic material a compound which fixes formaldehyde gas as disclosed in U.S. Pat. Nos. 4,411,987 and 4,435,503.

Various kinds of color couplers can be used in the present invention, and specific examples thereof are disclosed in the patents cited in the foregoing RD 17643 (Items VII-C to VII-G).

Preferred yellow couplers include those disclosed, e.g., in U.S. Pat. Nos. 3,933,501, 4,022,620, 4,326,024, 4,401,752 and 4,248,961, JP-B-58-10739, British Patents 1,425,020 and 1,476,760, U.S. Pat. Nos. 3,973,968, 4,314,023 and 4,511,649, and EP-A-0249473.

Preferred magenta couplers include 5-pyrazolone compounds and pyrazoloazole compounds. In particular, those disclosed in U.S. Pat. Nos. 4,310,619 and 4,351,897, European Patent 73,636, U.S. Pat. Nos. 3,061,432 and 3,725,067, RD 24220 (Jun. 1984), JP-A-60-33552, RD 24230 (Jun. 1984), JP-A-60-43659, JP-A-61-72238, JP-A-60-35730, JP-A-55-118034, JP-A-60-185951, U.S. Pat. Nos. 4,500,630, 4,540,654 and 4,556,630, WO (PCT) 88/04793 are used advantageously.

Preferred cyan couplers include those of phenol and naphthol types, as disclosed, e.g., in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, West German Patent Application (OLS) No. 3,329,729, EP-A-0121365, EP-A-0249453, U.S. Pat. Nos. 3,446,622, 4,333,999, 4,753,871, 4,451,559, 4,427,767, 4,690,889, 4,254,212 and 4,296,199, and JP-A-61-42658.

Preferred colored couplers for use in the present invention for compensating undesirable side absorptions of the color image include those disclosed, e.g., in RD 17643 (Item VII-G), U.S. Pat. No. 4,163,670, JP-B-57-39413, U.S. Pat. Nos. 4,004,929 and 4,138,258, and British Patent 1,146,368.

Preferred couplers for use in the present invention which form dyes of moderate diffusibility include those disclosed in U.S. Pat. No. 4,366,237, British Patent 2,125,570, European Patent 96,570, West German Patent Application (OLS) No. 3,234,533.

Typical examples of polymerized couplers for use in the present invention are disclosed, e.g., in U.S. Pat. Nos. 3,451,820, 4,080,211, 4,367,282, 4,409,320 and 4,576,910, and British Patent 2,102,173.

Also, couplers capable of releasing a photographically useful group in proportion to the progress of the coupling reaction can be used to advantage in the present invention. Preferred examples of couplers which release a development inhibitor, namely, a DIR coupler, include those disclosed in the patents cited in RD 17643 (Item VII-F), JP-A-57-151944, JP-A-57-154234, JP-A-60-184248, JP-A-63-37346, and U.S. Pat. No. 4,248,962. On the other hand, preferred examples of couplers which imagewise release a nucleating agent or a development accelerator upon development are disclosed in British Patents 2,097,140 and 2,131,188, JP-A-59-157638 and JP-A-59-170840.

Other couplers which can be used in the present invention include competing couplers as disclosed in U.S. Pat. No. 4,130,427, etc., multiequivalent couplers as disclosed in U.S. Pat. Nos. 4,283,472, 4,338,393 and 4,310,618, etc., DIR redox compound-releasing couplers, DIR coupler-releasing couplers, DIR coupler-releasing redox compounds or DIR redox compound-releasing redox compounds as disclosed in JP-A-60-185950 and JP-A-62-24252, couplers which release a dye which recovers its color after elimination as disclosed in EP-A-0173302, bleach accelerator-releasing couplers as described in RD 11449, RD 24241 and JP-A-61-201247, ligand-releasing couplers as disclosed in U.S. Pat. No. 4,553,477, leuco dye-releasing couplers as disclosed in JP-A-63-75747, etc.

The above described couplers can be introduced into the photographic material of the present invention using various known dispersion methods.

Examples of high boiling solvents for use in the oil-in-water dispersion method are described, e.g., in U.S. Pat. No. 2,322,027.

Suitable examples of high boiling organic solvents having a boiling point of 175° C. or higher under ordinary pressure for use in the oil-in-water dispersion method include phthalic acid esters, phosphoric or phosphonic acid esters, benzoic acid esters, amides, alcohols or phenols, aliphatic carboxylic acid esters, aniline derivatives, hydrocarbones, etc. In addition, organic solvents having a boiling point of from about 30° C., preferably about 50° C., to about 160° C. can be used as auxiliary solvent, typical examples of which include ethyl acetate, butyl acetate, ethyl propionate, methyl ethyl ketone, cyclohexanone, 2-ethoxy-ethylacetate, dimethylformamide, etc.

The latex dispersion method, processes and effects thereof, and latexes for use as an impregnant are specifically described in U.S. Pat. No. 4,199,363, West German Patent Application (OLS) Nos. 2,541,274 and 2,541,230, etc.

In the photosensitive material of the present invention, it is desirable that the total thickness of all of the hydrophilic colloid layers present on the side of the support having thereon the emulsion layers preferably is 28 μm or less, and preferably has a film swelling speed $T_{1/2}$ of 30 seconds or less. The term film thickness refers as the film thickness measured after conditioning for 2 days under an atmosphere of 25° C. and 55% RH, and the film swelling speed $T_{1/2}$ is determined by a method known by one of ordinary skill in the art. For example, the measurement can be made using a swellometer of the type described in A. Green et al., *Photgr. Sci. Eng.*, Vol. 19, No. 2, pp. 124–129, and $T_{1/2}$ is defined as the time required to reach one-half the saturated film thickness which is taken as 90% of the maximum swollen film thickness attained when the film is processed with a color developer at 30° C. for 3 minutes and 15 seconds.

The film swelling speed $T_{1/2}$ can be adjusted to the desired value by adding a hardener to the gelatin binder, or by modifying the storage condition after coating. The degree of swelling is preferably from 150 to 400%.

The degree of swelling can be calculated from the maximum swollen film thickness determined under the above-described condition, according to the following equation:

$$\frac{(\text{maximum swollen film thickness} - \text{film thickness})}{\text{film thickness}}.$$

The color photographic material prepared in accordance with the present invention can be development processed using the general methods described in the above-noted RD 17643 (pp. 28-29) and RD 18716 (p. 615, from left to right columns).

A color developing agent may be incorporated in the silver halide color photographic material of the present invention for simplification and speedup of the processing. The color developing agent incorporated into the silver halide color photographic material is advantageously used in the form of precursor. Suitable examples of the precursor include the idoaniline compounds disclosed in U.S. Pat. No. 3,342,597, Schiff base type compounds disclosed in U.S. Pat. No. 3,342,599, RD 14850 and RD 15159, and the compounds disclosed in RD 13924.

A preferred form of the photographic material of the present invention is a roll film, because the input signal is readily recorded onto the transparent magnetic recording layer in the course of film conveyance inside a camera or a printer. In the roll film, one frame of imagewise exposed part preferably has an area of from 350 mm² to 1,200 mm². A space wherein the magnetic information is recorded is preferably designed so as to be at least 15% of the area of one frame of the imagewise exposed part. More specifically, it is desirable that the number of perforations per one image plane is reduced as compared with that of the 135-format. In particular, a satisfactory result can be obtained when the number of perforations per one frame is less than 4.

On the other hand, information can be optically recorded within the magnetic information recordable space by means of a luminous body such as an LED. Also, it is desirable to superimpose optical information and magnetic information in the magnetic information recordable space. The format for magnetic recording preferably is in accordance with the method disclosed in World Patent 90-04205.

The photographic material of this invention stored in a rolled condition preferably assumes a form that it is kept in a cartridge. The most widely used cartridge is the present 135-format patrone. In addition, cartridges for use in the present invention include those proposed in the following patents; JP-A-U-58-67329 (The term "JP-A-U" as used herein means an "unexamined published Japanese utility model application"), JP-A-58-181035, JP-A-58-182634, JP-A-U-58-195236, U.S. Pat. No. 4,221,479, JP-A-01-231045, JP-A-02-170156, JP-A-02-205843, JP-A-02-210346, JP-A-02-199451, JP-A-02-201441, JP-A-02-214853, JP-A-02-211443, JP-A-02-264248, JP-A-03-37646, JP-A-03-37645, JP-A-02-124564, Japanese Patent Application Nos. 63-183344 and 01-21862, and U.S. Pat. Nos. 4,846,418, 4,848,693 and 4,832,275.

In particular, a cartridge having a means for controlling the position thereof inside a camera (as disclosed in Japanese Patent Application No. 01-214895) is preferred.

The present invention is now illustrated in more detail by reference to the following examples. However, the invention should not be construed as being limited to these examples. All percentages and parts are given by weight unless otherwise indicated.

EXAMPLE 1

Co-doped γ-ferric oxide having an $Fe^{2+}/Fe^{3+}$ weight ratio of 20/100 (which had a crystal form of needles, and a specific surface area of 38 m$^2$/g) was dispersed into water to prepare a 10 wt % dispersion. The Co content was 8 atomic % with respect to Fe.

A 100 g portion of the dispersion was mixed with 125 g of an 8 wt % water solution of gelatin, and dispersed finely therein. Then, the thus obtained fine dispersion was coated over the entire back surface of a cellulose triacetate film at a coverage of 0.3 g/m$^2$ based on ferromagnetic fine powder. The magnetic coating was then oriented by placing the coated film between the poles of a cobalt magnet (2,000 Gauss) while the magnetic layer was in a wet condition. The thus prepared film was designated Sample A.

Other samples were prepared in the same manner as described above, except the ferromagnetic fine power was replaced as indicated in Table 1. These samples were designated B to N. The form and the size of the ferromagnetic fine powders used in Samples B to N were about the same as those of Sample A.

Transmission densities of each sample, from A to N, and those of the uncoated cellulose triacetate film were measured using an X-RITE Status A (manufactured by X-RITE Co.) through each of B, G and R filters, and an average transmission density and a gray degree were determined from differences between the densities of each sample (from A to N) and the corresponding uncoated film. The results obtained are shown in Table 1.

As can be seen from Table 1, an average transmission density of 0.5 or less and a gray degree of 70% or more with respect to transmission density were both achieved when γ-ferric oxides containing $Fe^{2+}$ in a proportion of 5 wt % or more to $Fe^{3+}$, Co-doped γ-ferric oxides containing $Fe^{2+}$ in a proportion of 5 wt % or more to $Fe^{3+}$, chromium dioxide, or a fine powder of a ferromagnetic metal were employed.

On the other hand, it is clearly seen that Sample J prepared from $Fe^{2+}$-free γ-ferric oxide as used in JP-B-57-6576 and JP-A-53-109604, and Samples D, E and I prepared from γ-ferric oxides having a reduced $Fe^{2+}$ content had a gray degree of below 70%.

Next, each of the above-described samples A to N were provided with the same reversal color photographic emulsion layers on the side of the support opposite to that having the magnetic layer as described for Sample 101 of Example 1 in JP-A-02-854 on the side opposite to the ferromagnetic fine powder. In addition, Sample 0 was prepared by coating the foregoing photographic emulsions, but without a magnetic layer.

Sample 0 was subjected to gray exposure under conditions to provide a R-density of 0.8, and then subjected to photographic processing. Under the same filtering condition, Samples A to N provided with the photographic emulsions were each exposed so as to achieve an R-density of 0.8, followed by photographic processing. The photographic processing adopted herein was the same as described for Example 1 in JP-A-02-854.

Transmission densities of each of the thus processed samples were measured with an X-RITE Status A (produced by X-RITE Co.). Particularly, each sample was evaluated for the difference in R, G and B color density as compared to Sample 0, and for sensitivity relative to that of Sample 0 to red light taken as 100. The results obtained are shown in Table 1.

As can be seen from Table 1, the property of neutral gray was substantially maintained even in the presence of a ferromagnetic fine powder layer as long as the ferromagnetic fine powder in accordance with the present invention was used. In contrast to the samples of the present invention, samples prepared for comparison exhibited poor color balance, and as a result had unacceptable photographic properties. In addition, the sensitivity was lowered by raising the coverage of the ferromagnetic fine powder to such an extent as to increase the average transmission density in excess 0.5, as observed in Sample N.

Furthermore, samples A to N were evaluated for magnetic properties in accordance with the magnetic input-output test described in World Patent 90-04205. As a result, it was demonstrated that the samples except Sample M provided acceptable input-output operation in accordance with the above described evaluation method.

TABLE 1

| Sample | Ferromagnetic Fine Powder Kind | Coverage (g/m$^2$) | Average Transmission Density | Gray Degree | Photographic Properties After Coating of Photographic Emulsions | | | | Magnetic Characteristics | Note |
|--------|------|------|------|------|------|------|------|------|------|------|
| | | | | | $\Delta D^B$ | $\Delta D^G$ | $\Delta D^R$ | Relative Sensitivity | | |
| A-1 | Co-doped ferric oxide ($Fe^{2+}$:20%) | 0.3 | 0.05 | 80% | 0.01 | 0.01 | 0 | 98 | ◯ | Invention |
| A-2 | Co-doped ferric oxide ($Fe^{2+}$:20%) | 1.8 | 0.45 | 75% | 0.02 | 0.01 | 0 | 95 | ◯ | Invention |
| B | Co-doped ferric oxide ($Fe^{2+}$:10%) | 0.3 | 0.05 | 76% | 0.01 | 0.01 | 0 | 96 | ◯ | Invention |
| C | Co-doped ferric oxide ($Fe^{2+}$:5%) | 0.3 | 0.05 | 73% | 0.01 | 0.01 | 0 | 96 | ◯ | Invention |
| D | Co-doped ferric oxide ($Fe^{2+}$:3%) | 0.3 | 0.09 | 24% | 0.13 | 0.02 | 0 | 90 | ◯ | Comparison |
| E | Co-doped | 0.3 | 0.13 | 21% | 0.16 | 0.04 | 0 | 85 | ◯ | Comparison |

TABLE 1-continued

| Sample | Ferromagnetic Fine Powder Kind | Coverage (g/m²) | Average Transmission Density | Gray Degree | Photographic Properties After Coating of Photographic Emulsions $\Delta D^B$ | $\Delta D^G$ | $\Delta D^R$ | Relative Sensitivity | Magnetic Characteristics | Note |
|---|---|---|---|---|---|---|---|---|---|---|
| F | γ-ferric oxide ($Fe^{2+}$:0%) | 0.3 | 0.05 | 80% | 0.01 | 0.01 | 0 | 98 | ○ | Invention |
| G | γ-ferric oxide ($Fe^{2+}$:20%) | 0.3 | 0.05 | 75% | 0.01 | 0.01 | 0 | 96 | ○ | Invention |
| H | γ-ferric oxide ($Fe^{2+}$:10%) | 0.3 | 0.05 | 72% | 0.01 | 0.01 | 0 | 96 | ○ | Invention |
| I | γ-ferric oxide ($Fe^{2+}$:5%) | 0.3 | 0.10 | 22% | 0.14 | 0.03 | 0 | 90 | ○ | Comparison |
| J | γ-ferric oxide ($Fe^{2+}$:3%) | 0.3 | 0.13 | 19% | 0.21 | 0.04 | 0 | 84 | ○ | Comparison |
| K | Chromium dioxide ($Fe^{2+}$:0%) | 0.3 | 0.05 | 80% | 0.01 | 0.01 | 0 | 98 | ○ | Invention |
| L | Metallic Fe | 0.01 | 0.04 | 83% | 0.01 | 0.00 | 0 | 97 | ○ | Invention |
| M | Same as Sample A | 0.001 | 0.10 | 80% | 0.00 | 0.00 | 0 | 99 | X | Comparison |
| N | Same as Sample A | 3.5 | 0.54 | 69% | 0.19 | 0.12 | 0 | 60 | ○ | Comparison |

○: Good
X: Not Good

EXAMPLE 2

The emulsion layers used for the color negative photographic material described as Sample 201 of Example 2 of JP-A-02-90151 were coated onto the side of the support opposite that having the magnetic recording layers as described for each sample of the foregoing Example 1. The thus prepared recording materials were exposed as in Example 1 above and then subjected to the photographic processing as described in Example 2 of JP-A-02-90151. The processed recording materials were evaluated in the same manner as in Example 1 above. Similar results as in Example 1 above were obtained.

EXAMPLE 3

Dope solutions of cellulose triacetate were prepared having dispersed therein each of the ferromagnetic fine powders as described in Example 1, and a ferromagnetic powder-free dope solution of cellulose triacetate was spread together with each of the doped solutions to prepare a film base having a 2 μ-thick transparent magnetic recording layer and a total thickness of 122 μ. The same emulsion layers as in Example 1 were coated on the thus prepared film base, and were exposed, processed and evaluated in the same manner as in Example 1. Similar results as in Example 1 were obtained.

When a silver halide color photographic material is provided with the transparent magnetic recording layer of the present invention, the resulting photographic material enables information recording of various types. For example, at the time of photograph-taking with a camera, information recording at the time of development and/or printing, and information recording of other types, e.g., recording of output information for television/video, without adversely affecting the photographic properties, e.g., without disturbing the color balance, is provided.

While the invention has been described in detail and with reference to specific embodiments thereof, it will be apparent to one skilled in the art that various changes and modifications can be made therein without departing from the spirit and scope thereof.

I claim:

1. A silver halide color photographic material comprising a transparent support having provided on the frontside thereof at least one hydrophilic colloid layer at least one layer of which is a photosensitive silver halide emulsion layer, said photographic material further comprising a transparent magnetic recording layer provided on the backside of the transparent support, said magnetic layer containing a ferromagnetic fine powder containing $Fe^{2+}$ in a proportion of 5-50 wt % to $Fe^{3+}$ dispersed in a binder at a coverage of from $10^{-2}$ to 1.8 g/m² based on the weight of the ferromagnetic fine powder and having a gray degree of transmission density of 70% or more and an average transmission density of 0.5 or less in the visible region.

2. A silver halide color photographic material as in claim 1, wherein the ferromagnetic fine powder is magnetic iron oxide containing $Fe^{2+}$ in a proportion of 5-50wt % to $Fe^{3+}$.

3. A silver halide color photographic material as in claim 1, wherein the ferromagnetic fine powder is cobalt modified magnetic iron oxide containing $Fe^{2+}$ in a proportion of 5-50 wt % to $Fe^{3+}$.

4. A silver halide color photographic material as in claim 1, wherein the ferromagnetic fine powder is chromium dioxide.

5. A silver halide color photographic material as in claim 1, wherein the ferromagnetic fine powder is fine powder of a ferromagnetic metal.

6. A silver halide color photographic material as in claim 1, wherein the ferromagnetic fine powder is magnetic iron oxide containing $Fe^{2+}$ in a proportion of 10-50 wt % to $Fe^{3+}$.

7. A silver halide color photographic material as in claim 1, wherein the ferromagnetic fine powder is magnetic iron oxide containing $Fe^{2+}$ in a proportion of 15-50 wt % to $Fe^{3+}$.

8. A silver halide color photographic material as in claim 1, wherein the ferromagnetic fine powder is cobalt modified magnetic iron oxide containing $Fe^{2+}$ in a proportion of 10-50 wt % to $Fe^{3+}$.

9. A silver halide color photographic material as in claim 1, wherein the ferromagnetic fine powder is cobalt modified magnetic iron oxide containing $Fe^{2+}$ in a proportion of 15-50 wt % to $Fe^{3+}$.

10. A silver halide color photographic material as in claim 1, wherein the magnetic recording layer has a thickness of from 0.1 to 10 microns.

11. A silver halide color photographic material as in claim 1, wherein said photographic material is in the form of a roll film.

* * * * *